US012712817B2

(12) United States Patent
Sevindik

(10) Patent No.: US 12,712,817 B2
(45) Date of Patent: Aug. 18, 2026

(54) ADAPTING TCP IN VARIABLE JITTER ENVIRONMENTS

(71) Applicant: CHARTER COMMUNICATIONS OPERATING, LLC, St. Louis, MO (US)

(72) Inventor: Volkan Sevindik, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 725 days.

(21) Appl. No.: 17/533,228

(22) Filed: Nov. 23, 2021

(65) Prior Publication Data

US 2023/0164084 A1 May 25, 2023

(51) Int. Cl.
*H04L 47/283* (2022.01)
*H04L 12/28* (2006.01)
(Continued)

(52) U.S. Cl.
CPC ........ *H04L 47/283* (2013.01); *H04L 12/2801* (2013.01); *H04L 43/087* (2013.01); *H04L 43/16* (2013.01)

(58) Field of Classification Search
CPC ..... H04L 47/283; H04L 47/76; H04L 47/762; H04L 12/2801; H04L 41/0813;
(Continued)

(56) References Cited

U.S. PATENT DOCUMENTS 6,963,541 B1 * 11/2005 Vogel .................. H04L 41/0806 725/111
7,145,887 B1 * 12/2006 Akgun ................ H04L 12/2801 370/321
(Continued)

FOREIGN PATENT DOCUMENTS

CN 102957946 A * 3/2013 ........... H04L 65/612
EP 1045546 A2 * 10/2000 ............. H04L 12/14
(Continued)

OTHER PUBLICATIONS

Mani et al., "QoS and bandwidth management in broadband cable access network", Computer Networks 43 (Year: 2003).*

*Primary Examiner* — Oscar A Louie
(74) *Attorney, Agent, or Firm* — Patent Beach PC

(57) ABSTRACT

Various embodiments comprise systems, methods, mechanisms, and apparatus adapting Transmission Control Protocol (TCP) traffic flows between a cable modem termination system (CMTS) and a plurality of cable modems (CMs) connected thereto via respective CMTS-CM TCP connections supported by respective CMTS-CM communication links. Each CMTS-CM communication link is monitored to determine Quality of Service (QoS) information including jitter information. If the jitter information associated with a particular CMTS-CM communications link exceeds a threshold level (e.g., a level where TCP ACK/NACK reception timeout may occur), then the TCP connection(s) supported by the communication link are adapted to function in a non-normative manner by, illustratively, increasing down-
(Continued)

link and/or uplink throughput of TCP connections supported by the communications link irrespective of the usual or normative response of the TCP connection(s).

20 Claims, 2 Drawing Sheets

(51) Int. Cl.
*H04L 43/087* (2022.01)
*H04L 43/16* (2022.01)

(58) Field of Classification Search
CPC ............... H04L 41/0816; H04L 41/082; H04L 41/0823; H04L 41/083; H04L 41/0896; H04L 43/0852; H04L 43/08; H04L 43/087; H04L 43/0882; H04L 43/0888; H04L 43/16; H04L 65/80
See application file for complete search history.

(56) References Cited

U.S. PATENT DOCUMENTS 7,269,159 B1 * 9/2007 Lai ........................ H04J 3/1647 370/468
7,397,846 B1 * 7/2008 Beser .................... H04L 47/125 375/222
7,426,181 B1 * 9/2008 Feroz ...................... H04L 47/10 370/231
7,609,640 B2 10/2009 Ahuja et al.
7,724,750 B2 5/2010 Swami et al.
8,228,815 B2 * 7/2012 Keromytis .......... H04L 43/0882 370/252
9,363,188 B2 * 6/2016 Patrick .................... H04L 47/32
11,689,426 B2 * 6/2023 Costa .................. H04L 12/2801 370/329
2004/0100979 A1 * 5/2004 Mandin ................. H04L 69/163 370/402
2004/0213278 A1 * 10/2004 Pullen ................... H04L 1/1854 370/428
2006/0120282 A1 * 6/2006 Carlson ............... H04L 41/5067 370/431
2008/0037420 A1 2/2008 Tang
2008/0049632 A1 * 2/2008 Ray ..................... H04L 43/0852 370/250
2012/0044930 A1 * 2/2012 Ajero .................. H04L 65/1036 370/352
2013/0308454 A1 * 11/2013 Akhtar .................... H04L 65/80 370/235
2017/0230211 A1 * 8/2017 Teflian ................... H04B 15/00
2019/0115950 A1 * 4/2019 Kakinada .............. H04W 76/15

FOREIGN PATENT DOCUMENTS

EP 2890065 A1 * 7/2015 ........... H04L 47/283
FI 20195030 A1 * 7/2020 ......... H04N 21/4425
KR 100888919 B1 * 3/2009 ............. H04L 43/10
WO WO-2018032275 A1 * 2/2018 ............ H04W 72/04

* cited by examiner

200

ADAPTING TCP IN VARIABLE JITTER ENVIRONMENTS

FIELD OF THE DISCLOSURE

The present disclosure relates generally to transmission control protocol (TCP) and, more particularly, to a method and apparatus for adapting a TCP data packet size selection mechanism in a variable jitter communications channel.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Transmission Control Protocol (TCP) is a well known data transmission protocol used by many communications networks including wireless networks, such as to transmit data between a core network and a base station, eNodeB, gNodeb and the like in wireless communications with user equipment (UE) receiving network services therefrom. For example, many Mobile Web Services (MWS) use HTTP/TCP/IP (Hyper Text Transfer Protocol/Transmission Control Protocol/Internet Protocol) for communication between a web service client and a service provider, which includes the radio link.

In an attempt to control network congestion, TCP implements congestion avoidance and control algorithms. For example, at the onset of communication between a network proxy and a client, TCP implements a "slow-start" algorithm in which an initial data packet size is used for data transmission (e.g., from client to network proxy), wherein the transmission data packet size used for a next data packet is doubled in response to acknowledged successful reception (ACK) of a current packet, and halved in response to acknowledged unsuccessful reception (NACK) of the current packet (or a timeout). While this mechanism works reasonably well, it does not contemplate opportunities for improvement, or relevant limitations, associated with certain network topologies.

SUMMARY

Various deficiencies in the prior art are addressed by systems, methods, mechanisms, and apparatus adapting Transmission Control Protocol (TCP) traffic flows between a cable modem termination system (CMTS) and a plurality of cable modems (CMs) connected thereto via respective CMTS-CM TCP connections supported by respective CMTS-CM communication links. Each CMTS-CM communication link is monitored to determine Quality of Service (QoS) information including jitter information. If the jitter information associated with a particular CMTS-CM communications link exceeds a threshold level (e.g., a level where TCP ACK/NACK reception timeout may occur), then the TCP connection(s) supported by the communication link are adapted to function in a non-normative manner by, illustratively, increasing downlink and/or uplink throughput of TCP connections supported by the communications link irrespective of the usual or normative response of the TCP connection(s).

One embodiment provides a method for adapting Transmission Control Protocol (TCP) traffic flows between a cable modem termination system (CMTS) and a plurality of cable modems (CMs) connected thereto via respective CMTS-CM TCP connections supported by respective CMTS-CM communication links, each CMTS-CM communication link being monitored by the CMTS, the method comprising: in response to a determination that a jitter level of a CM-CMTS communication link exceeds a threshold level, configuring a corresponding CM-CMTS TCP downlink (DL) connection to cause an increase in downlink data throughput.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
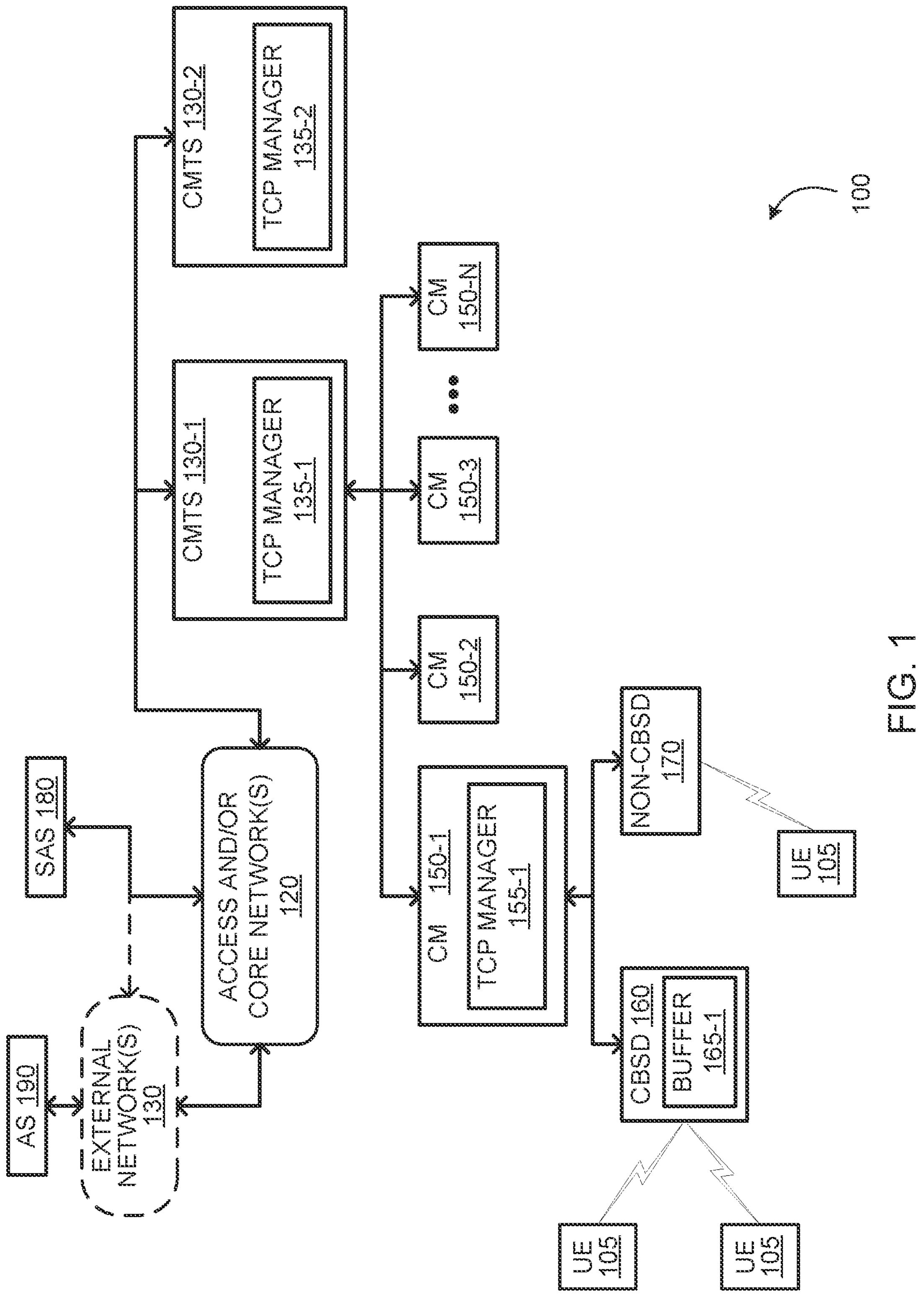
FIG. 1 depicts a high-level block diagram of a network services architecture benefiting from various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments utilize a counter-intuitive approach to Transmission Control Protocol (TCP) connection management in that the presence of jitter in a communications channel supporting a TCP connection is not deemed to be an indication of a throughput limiting channel condition within the context of relevant use cases such as described herein.

Jitter may be defined as a delay variation or average data transmission latency associated with a communication link (or communications channel comprising a plurality of links), and is generally related to distance between transmitter and receiver, channel bandwidth, processing time of devices routing the data packets, and the like. Depending on the jitter imparted to the data, effective data transmission speed changes, service quality may be impacted, and so on.

Generally speaking, jitter is not desirable. However, the inventor has recognized that in some situations the presence of jitter is not the most relevant indication of QoS. In these situations, the impact of jitter upon the TCP connection is such that a laggy but not lossy connection may not return an ACK message within the normative TCP timeout period, even though the data is being successfully received.

Various embodiments are directed to Transmission Control Protocol (TCP) traffic flows between a cable modem termination system (CMTS) and a plurality of cable modems (CMs) connected thereto via respective CMTS-CM TCP connections supported by respective CMTS-CM communication links. In these embodiments, each CMTS-CM communication link is monitored to determine Quality of Service (QoS) information including jitter information. If the jitter information associated with a particular CMTS-CM communications link exceeds a threshold level (e.g., a level where TCP ACK/NACK reception timeout may occur), then the TCP connection(s) supported by the communication link are adapted to function in a non-normative manner by, illustratively, increasing downlink and/or uplink throughput of TCP connections supported by the communications link irrespective of the usual or normative response of the TCP connection(s). Such monitoring may be provided by the relevant CM 150, CMTS 130, and/or specific PE network monitoring entity configured to fulfill this function such as a TCP manager built into the CMTS 130 or CM 150135/155, a stand-alone monitoring device, an entity transmitting probe packets/traffic through the relevant links and so on.

Non-normative adjustments of TCP connection behavior may comprise, illustratively, ignoring ACK/NACK information that might otherwise cause a decrease in slow start (SS) data packet size, thereby forcing the use of significantly larger SS data packet sizes (e.g., 50%-100% of maximum SS data packet size for a TCP connection), increasing SS packet size in response to a received ACK message by an amount than a nominal TCP SS packet size increase, decreasing SS packet size in response to a received NACK message by an amount less than a nominal TCP SS packet size decrease, and/or causing other throughput-related modifications to TCP connection behavior or operating parameters.

FIG. 1 depicts a high-level block diagram of a network services architecture benefiting from various embodiments Specifically, the exemplary network services architecture 100 of FIG. 1 is depicted as an architecture suitable for use by, for example, a network services provider such as a multiple-service operator (MSO) and the like, though other types of network services providers and network topologies also benefic from the disclosed embodiments.

As depicted in FIG. 1, a network services provider has deployed one or more access and/or core networks 120 as well as various provider equipment (PE) support the delivery of network services to user equipment 105 connected to the PE, such as in support of UE 105 interacting with headend devices, servers, and the like within the access and/or core networks 120 (e.g., cable television head-end for delivering video streams to customers, a telecommunications hub/switch providing voice/data services to customers, and so on) or via external networks 130. For example, as depicted in FIG. 1 an application server 190 communicates via the access and/or core networks 120 either directly or through one or more external networks 130 such as the internet). External or internal application servers may support content distribution, a video conferencing, a remote voice or data connections, or any other type of application server function or media/information distribution function.

As depicted in FIG. 1, the PE associated with the network services provider comprises one or more cable modem termination systems (CMTSs) 130 (e.g., CMTSs 130-1 and 130-2), where each CMTS 130 is coupled via respective communication links to a respective plurality of cable modems (CMs) 150, illustratively CMs 150-1 through 150-N as shown with respect to CMTS 130-1. Communication between the PE networks 120, CMTSs 130, and CMs 150 may be provided using the Data Over Cable Service Interface Specification (DOCSIS).

As depicted in FIG. 1, some or all of the CMs 150 may be further connected to communication nodes 160/170 suitable for providing wireless networking services to UE 105. The communication nodes 160/170 may comprise eNBs or gNBs communications with UE 105 using mobile network protocols such as 3G, 4G/LTE, 5G and the like. The communication nodes 160/170 may include buffers (e.g., such as buffer 165-1 depicted with respect to CBSD 160 of FIG. 1) configured to buffer data flows to UE 105 connected thereto so as to temporally smooth the delivery to UE of relevant data received via a high throughput channel/link from the CM.

The UE 105 may comprise any suitable type of device, such as cellular phones, smart phones, tablet devices, Internet of Things (IoT) devices, machine-to-machine (M2M) communication devices, and so on.

The communication nodes 160/170 may comprise communications nodes or resources using licensed spectrum, unlicensed spectrum such as citizens broadband radio service (CBRS) spectrum, or a combination of licensed and unlicensed spectrum. The communication nodes 160/170 may, in various embodiments, include mid-band (e.g., 3.5 GHz) gNBs, low-band (e.g., under 1 GHz) gNBs, or a combination of mid-band and low-band gNBs. In the case of communication nodes 160 having Citizens Broadband Radio Service Device (CBSD) capability, allocations of CBRS spectrum are provided via a Spectrum Access System (SAS) 180. Generally speaking, the SAS 180 communicates with a core network (e.g., a 5G core network) and is configured to control access to the CBRS frequency band for CBSD communication nodes 160 and related eNBs/gNBs provided thereby. Generally speaking, the SAS 180 is configured to ensure that the CBRS frequency band is allocated for CBSD use by, for example, CBSD 160, and that such use is adapted government requirements, network congestion, network interference and the like.

As depicted in FIG. 1, a CBSD eNB/gNB 160 is located at the end of a cable strand and connected to cable modem (CM) 150-1, which is in turn coupled to cable modem termination system CMTS 130-1, which is in turn coupled to a core network (e.g., a 5G core network) 120 for sending/receiving UE data and the like.

In operation, the links connecting CMs 150 and CMTSs 130 may experience a large amount of jitter, and this jitter impacts the speed/throughput of downlink data delivered to CBSD 160. The speed/throughput of uplink data delivered from CBSD 160 to CMTS 130 may also be impacted.

Generally speaking, data is sent from the core network 120 to CMTSs 130, where it is distributed to the multiple CMs connected to the CMTS 130 via respective CMTS-CM links. Each of the CMTS-CM link experiences jitter, and the amount of jitter may differ between CMTS-CM links. The CMTS 130 may be configured to measure the jitter of each of its CMTS-CM links. This measurement may be stored at the CMTS 130 or relevant PE management entity associated with the CMTS-CM link, such as via the relevant CM identifier.

QoS measurements including jitter measurement/determination may be provided via a QoS monitoring function associated with the relevant CM 150, CMTS 130 (e.g., operating status/event information such as normally provided by any PE entities used to route packets/traffic), or of a specific PE network monitoring entity configured to fulfill this function such as a TCP manager built into the CMTS 130 or CM 150135/155, or of a stand-alone monitoring device, an entity transmitting probe packets/traffic through the relevant links and so on.

For each CMTS-CM link, respective uplink and downlink TCP sessions are established between the CMTS 130 and CM 150. These TCP connections may operate in a normative manner with respect to the TCP protocols, such as the TCP slow start (SS) mechanism wherein TCP connection transmitters increase or decrease the size of subsequently transmitted data packets in accordance with ACK/NACK signals received from the relevant TCP receiver (or ACK/NACK timeout conditions).

The various embodiments adapt normative TCP protocol behavior to increase throughput and the like, as will now be described with respect to FIG. 2. In various embodiments, the operation of the CM 150 and/or CMTS 130 with respect to the embodiments described herein are controlled via PE equipment such as head end servers, element management systems (EMSs), network management systems (NMS) and the like. In various embodiments, one or both of the CM 150 and/or CMTS 130 include an optional TCP manager; namely, TCP manager 155-1 and 135-1 as depicted in FIG. 1.

It is noted that various elements or portions thereof depicted in FIG. 1 and having functions described herein are implemented at least in part as computing devices having communications capabilities. These elements or portions thereof are implemented or instantiated via computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

For example, various embodiments are implemented using network services provider equipment comprising processing resources (e.g., one or more servers, processors and/or virtualized processing elements or compute resources) and non-transitory memory resources (e.g., one or more storage devices, memories and/or virtualized memory elements or storage resources), wherein the processing resources are configured to execute software instructions stored in the non-transitory memory resources to implement thereby the various methods and processes described herein. The network services provider equipment may also be used to provide some or all of the various other functions described herein.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Figure 2:
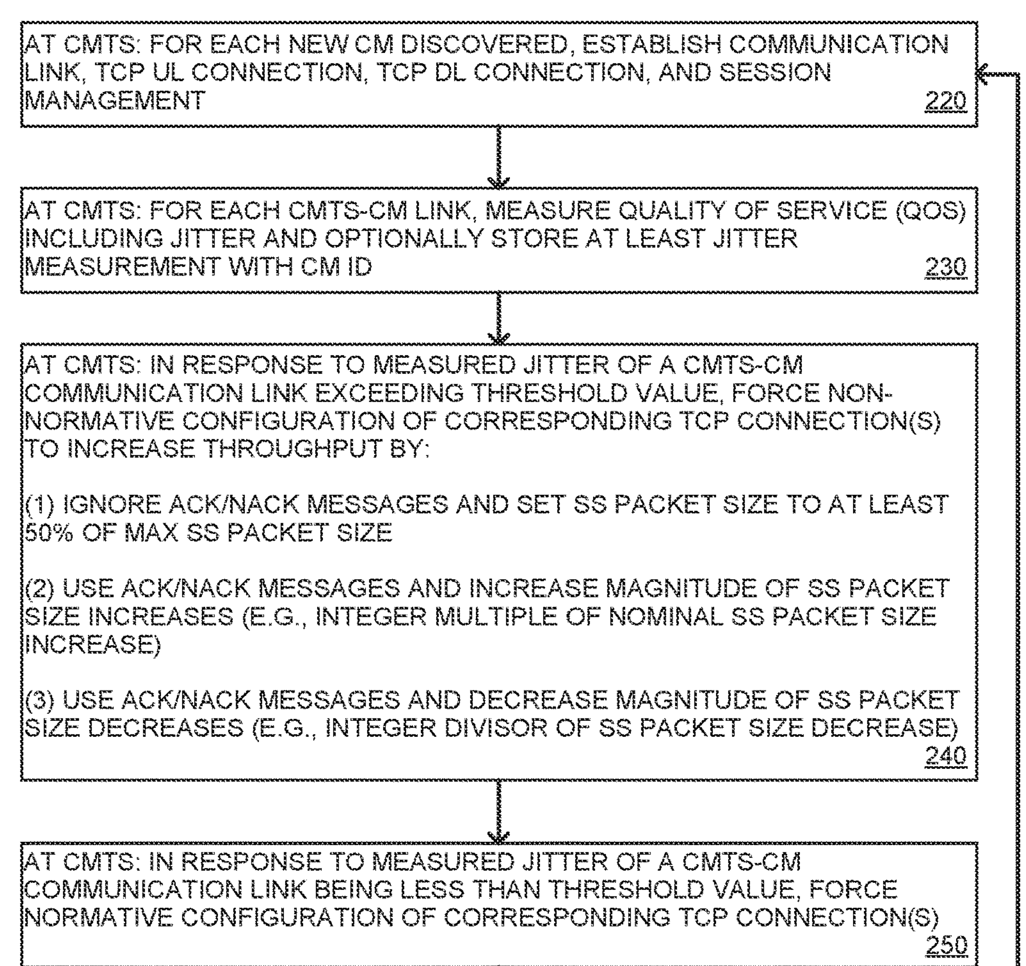
FIG. 2 depicts a flow diagram of methods according to various embodiments.

FIG. 2 depicts a flow diagram of methods according to various embodiments. Specifically, FIG. 2 depicts a TCP modification method wherein the presence of jitter in a CMTS-CM link is used to trigger the use of a non-normative TCP configuration to increase throughput in the high-jitter communications link or channel.

The method 200 of FIG. 2 may be performed via the CMTS 130 (with or without a TCP manager 135), the CM 150 (with or without a TCP manager 155), or via a discrete management entity or server within the access network 120 or head end. Any of these managers or management entities may be implemented using processors or processing resources and non-transitory memory resources, wherein the processors or processing resources are configured to execute software instructions stored in the non-transitory memory resources to implement thereby the various methods and processes described herein. Any of these entities may further include communications resources configured to enable communications with CMTS 130, CM 150, CBSD gNB/eNB 160, non-CBSD gNB/eNB 170, and/or any logical or physical networking elements therebetween so as to receive QoS information including jitter information as described herein.

Specifically, FIG. 2 depicts methods of adapting TCP operation between CMTS 130 and CM 150 in response to increases or decreases in measured jitter in the relevant communications link or channel therebetween so as to increase data throughput in the presence of jitter by forcing a non-normative TCP configuration while the jitter is above a threshold level, and by restoring the normative TCP configuration when the jitter falls below the threshold level.

At step 210, at each CBSD gNB/eNB 160 being powered on or initialized, the following actions are taken: (1) The CBSD registers with the SAS 180 and receives therefrom a spectrum grant; (2) based on the spectrum grant and the number of UEs 105 being serviced by the CBSD, at least one beam is created for each of the UE 105 connecting thereto; (3) the CBSD begins providing network services to each UE connected thereto via the one or more beams supporting respective TCP uplink and TCP downlink connections; and (4) data or UE connected thereto is buffered so as to temporally smooth the delivery to UE of relevant data received via a high throughput channel/link from the CM.

At step 220, at the CMTS 130 (or a TCP manager), for each CM 150 discovered or connected thereto, a respective CMTS-CM communications link or channel is established, along with a downlink CMTS to CM TCP connection, an uplink CM to CMTS TCP connection, and any session management parameters.

A step 230, at the CMTS 130 (or a TCP manager) and for each CMTS-CM link, the Quality of Service (QoS) of the link is measured on a periodic or substantially continuous basis. The QoS measurements for each CMTS-CM link include a jitter measurement, which is optionally stored with the relevant CM identifier in memory at the CMTS or at a PE management entity.

QoS measurements including jitter measurement/determination may also be provided via a QoS monitoring function associated with the relevant CM 150, CMTS 130 (e.g., operating status/event information such as normally provided by any PE entities used to route packets/traffic), or of a specific PE network monitoring entity configured to fulfill this function such as a TCP manager built into the CMTS 130 or CM 150135/155, or of a stand-alone monitoring device, an entity transmitting probe packets/traffic through the relevant links and so on.

At step 240, at the CMTS 130 (or a TCP manager), if the measured jitter of a CMTS-CM link exceeds a threshold value, then the method 200 forces a non-normative configuration of at least the corresponding CM-CMTS TCP downlink (DL) connection to cause an increase in downlink data throughput.

Jitter may be defined as a variation in the latency of packets/traffic, with a unit measure of milliseconds. For reference, jitter in a typical DOCSIS network consisting of CMTS-CM may be 20-30 milliseconds. Higher jitter values are associated with lower network quality, since jitter impacts the delivery and reception time of the packets. In various embodiments, if jitter is higher than some threshold level (e.g., 20 msec for a DOCSIS network), then DL transmission is accelerated, whereas if the jitter is lower than 20 msec a second method may ne applied as discussed herein.

The forced non-normative configuration may comprise one or more of: (1) ignore ACK/NACK messages and set SS packet size to at least 50% of max ss packet size (e.g., 50%, 75%, 100%); (2) use ACK/NACK messages and increase magnitude of SS packet size increases (e.g., integer multiple of nominal a SS packet size increase); and (3) use ACK/NACK messages and decrease magnitude of SS packet size decreases (e.g., integer divisor of SS packet size decrease)

Optionally at step 240, the method 200 forces a non-normative configuration of at least the corresponding CM-CMTS TCP uplink (UL) connection to cause an increase in uplink data throughput. This is achieved by sending a control message to the relevant CM that, when processed by the CM, will cause the CM to force the desired non-normative configuration of the CM-CMTS TCP uplink (UL) connection in accordance with any of the forced non-normative configurations discussed immediately above.

At step 250, at the CMTS 130 (or a TCP manager), if the measured jitter of a CMTS-CM link no longer exceeds the threshold value, then the method 200 restores the normative configuration of at the corresponding CM-CMTS TCP downlink (DL) connection and, if previously modified at step 240, the corresponding CM-CMTS TCP uplink (UL) connection.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof

What is claimed is:

1. A method for configuring Transmission Control Protocol (TCP) traffic flows between a cable modem termination system (CMTS) and a plurality of cable modems (CMs) connected thereto via respective CMTS-CM TCP connections supported by respective CMTS-CM communication links, each CMTS-CM communication link being monitored by the CMTS, the method comprising:

monitoring, via the CMTS, each CMTS-CM communication link to determine whether a jitter level of a CM-CMTS communication link exceeds a threshold level; and in response to a determination that the jitter level of the CM-CMTS communication link exceeds the threshold level, configuring a corresponding CM-CMTS TCP downlink (DL) connection to cause an increase in downlink data throughput.

2. The method of claim 1, wherein the CM-CMTS TCP downlink (DL) connection is configured to select a slow start (SS) packet size of at least 50% of a maximum SS packet size of the CM-CMTS TCP DL.

3. The method of claim 1, wherein the CM-CMTS TCP downlink (DL) connection is configured to select a slow start (SS) packet size of a maximum SS packet size of the CM-CMTS TCP DL connection.

4. The method of claim 1, wherein the CM-CMTS TCP downlink (DL) connection is configured to increase SS packet size in response to a received ACK message, wherein the SS packet size increase is greater than a nominal TCP SS packet size increase.

5. The method of claim 4, wherein the SS packet size increase is an integer multiple of the nominal TCP SS packet size increase.

6. The method of claim 4, wherein the SS packet size increase is at least double the nominal TCP SS packet size increase.

7. The method of claim 1, wherein the CM-CMTS TCP downlink (DL) connection is configured to decrease SS packet size in response to a received NACK message, wherein the SS packet size decrease is less than a nominal TCP SS packet size decrease.

8. The method of claim 7, wherein the SS packet size decrease is an integer divisor of the nominal TCP SS packet size decrease.

9. The method of claim 8, wherein the SS packet size decrease is no more than half the nominal TCP SS packet size decrease.

10. The method of claim 1, wherein the jitter associated with each CMTS-CM link is measured at the CMTS.

11. The method of claim 1, further comprising:

in response to a determination that a jitter level of a CM-CMTS communication link exceeds a threshold level, transmitting toward the corresponding CM a control message configured to cause the CM to configure a corresponding CM-CMTS TCP uplink (UL) connection to cause an increase in uplink data throughput.

12. The method of claim 11, wherein the CM-CMTS TCP uplink (UL) connection is configured to select a slow start (SS) packet size of at least 50% of a maximum SS packet size of the CM-CMTS TCP UL connection.

13. The method of claim 11, wherein the CM-CMTS TCP uplink (UL) connection is configured to select a slow start (SS) packet size of a maximum SS packet size of the CM-CMTS TCP UL connection.

14. The method of claim 11, wherein the CM-CMTS TCP uplink (UL) connection is configured to increase SS packet size in response to a received ACK message, wherein the SS packet size increase is greater than a nominal TCP SS packet size increase.

15. The method of claim 14, wherein the SS packet size increase is an integer multiple of the nominal TCP SS packet size increase.

16. The method of claim 11, wherein the CM-CMTS TCP uplink (UL) connection is configured to decrease SS packet size in response to a received NACK message, wherein the SS packet size decrease is less than a nominal TCP SS packet size decrease.

17. The method of claim 16, wherein the SS packet size decrease is an integer divisor of the nominal TCP SS packet size decrease.

18. A Transmission Control Protocol (TCP) manager including one or more physical or virtualized processing resources implemented by tangible computing hardware and non-transitory memory resources, wherein the one or more physical or virtualized processing resources are configured to execute software instructions stored in the non-transitory memory resources to implement thereby a method for configuring Transmission Control Protocol (TCP) traffic flows between a cable modem termination system (CMTS) and a plurality of cable modems (CMs) connected thereto via respective CMTS-CM TCP connections supported by respective CMTS-CM communication links, each CMTS-CM communication link being monitored by the CMTS, the method comprising:

in response to a determination that a jitter level of a CM-CMTS communication link exceeds a threshold level, configuring a corresponding CM-CMTS TCP downlink (DL) connection to cause an increase in downlink data throughput via use of at least one of (i) received ACK messages or (ii) received NACK messages.

19. The TCP manager of claim 18, wherein the TCP manager is implemented within at least one of a CMTS or a CM in communication with the CMTS.

20. Computer readable apparatus comprising a non-transitory storage medium, the non-transitory storage medium comprising at least one computer program having a plurality of instructions, the plurality of instructions configured to, when executed on a processing apparatus, cause a Transmission Control Protocol (TCP) manager apparatus to:

based on a determination that a jitter level of a CM-CMTS communication link exceeds a threshold level, configuring a corresponding CM-CMTS TCP downlink (DL) connection to cause an increase in downlink data throughput, the CM-CMTS TCP downlink (DL) connection configured to cause at least one of (i) an increase in slow start (SS) packet size in response to a received ACK message, or (ii) a decrease in SS packet size in response to a received NACK message.

* * * * *